US010479514B2

(12) United States Patent
Mouton et al.

(10) Patent No.: US 10,479,514 B2
(45) Date of Patent: Nov. 19, 2019

(54) ASSEMBLY FOR TURBINE MACHINE WITH OPEN ROTOR CONTRA-ROTATING PROPELLERS, COMPRISING A SMALL DUCT FOR THE PASSAGE OF ANCILLARIES

(71) Applicant: SAFRAN AIRCRAFT ENGINES, Paris (FR)

(72) Inventors: Clementine Charlotte Marie Mouton, Tourman en Brie (FR); Olivier Belmonte, Perthes en Gatinais (FR); Jeremy Phorla Lao, Remire-Montjoly (GF); Didier Jean-Louis Yvon, Savigny sur Orge (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 354 days.

(21) Appl. No.: 15/398,445

(22) Filed: Jan. 4, 2017

(65) Prior Publication Data
US 2017/0190433 A1     Jul. 6, 2017

(30) Foreign Application Priority Data

Jan. 5, 2016   (FR) .................................... 16 50023

(51) Int. Cl.
*B64D 27/10*   (2006.01)
*B64C 11/30*   (2006.01)
(Continued)

(52) U.S. Cl.
CPC ............ *B64D 27/10* (2013.01); *B64C 11/306* (2013.01); *B64C 11/38* (2013.01); *B64C 11/48* (2013.01);
(Continued)

(58) Field of Classification Search
CPC ... B64D 27/10; B64D 2027/005; F02K 3/025; F02K 3/072; F02C 7/36; F02C 3/04;
(Continued)

(56) References Cited

U.S. PATENT DOCUMENTS 6,200,091 B1 * 3/2001 Bromann ................ F01D 11/18
415/173.1
2014/0301849 A1 * 10/2014 Snyder ...................... F01D 1/02
416/182

(Continued)

FOREIGN PATENT DOCUMENTS

| EP | 2 351 925 A2 | 8/2011 |
|---|---|---|
| FR | 2 993 631 | 1/2014 |
| FR | 3 014 141 | 6/2015 |

OTHER PUBLICATIONS

French Preliminary Search Report dated Jul. 13, 2016 in French Application 16 50023 filed on Jan. 5, 2016 (with English Translation of Categories of Cited Documents).
(Continued)

*Primary Examiner* — Essama Omgba
*Assistant Examiner* — Stephen A Mick
(74) *Attorney, Agent, or Firm* — Oblon, McClelland, Maier & Neustadt, L.L.P.

(57) ABSTRACT

An assembly for an aircraft turbine machine including a receiver for a pair of open rotor contra-rotating propellers, the assembly including a duct, ancillaries routed inside the duct, an attachment case, attachment device of the duct on an annular installation portion of the case. The attachment device in an assembled configuration include a split ring fitted with internal projections housed inside orifices in the duct; a radial loading surface of the ring made on the portion the surface being tapered and narrowing along a first axial direction, and being in contact with a peripheral surface of the complementary shaped tapered split ring; device of
(Continued)

axially loading the ring along the first direction, the device being blocked in the axial direction on the portion.

10 Claims, 5 Drawing Sheets

(51) Int. Cl.
| | |
|---|---|
| *B64C 11/38* | (2006.01) |
| *B64C 11/48* | (2006.01) |
| *F02C 3/04* | (2006.01) |
| *F02C 7/36* | (2006.01) |
| *F01D 7/00* | (2006.01) |
| *F01D 9/06* | (2006.01) |
| *F02K 3/072* | (2006.01) |
| *F02K 3/02* | (2006.01) |
| *B64D 27/00* | (2006.01) |

(52) U.S. Cl.
CPC ............... *F01D 7/00* (2013.01); *F01D 9/065* (2013.01); *F02C 3/04* (2013.01); *F02C 7/36* (2013.01); *F02K 3/025* (2013.01); *F02K 3/072* (2013.01); *B64D 2027/005* (2013.01); *F05D 2220/323* (2013.01); *F05D 2220/325* (2013.01); *F05D 2230/60* (2013.01); *F05D 2240/90* (2013.01); *F05D 2260/40311* (2013.01); *F05D 2260/79* (2013.01); *F05D 2270/64* (2013.01); *Y02T 50/66* (2013.01); *Y02T 50/671* (2013.01); *Y02T 50/673* (2013.01)

(58) Field of Classification Search
CPC ......... F01D 9/065; F01D 7/00; B64C 11/306; B64C 11/38; B64C 11/48; F05D 2270/64; F05D 2230/60; F05D 2220/325; F05D 2260/79; F05D 2240/90; F05D 2260/40311; F05D 2220/323
USPC ........................................................ 416/128
See application file for complete search history.

(56) References Cited

U.S. PATENT DOCUMENTS

2016/0245122 A1  8/2016 Rosset et al.
2016/0348590 A1* 12/2016 Porter ..................... F02C 3/04

OTHER PUBLICATIONS

U.S. Appl. No. 14/208,485, filed Mar. 13, 2014, 2014/0271151 A1, Olivier Belmonte et al.
U.S. Appl. No. 14/361,954, filed May 30, 2014, 2014/0341722 A1, Olivier Belmonte et al.
U.S. Appl. No. 14/414,343, filed Feb. 12, 2015, 2015/0219014 A1, Olivier Belmonte et al.

* cited by examiner

ASSEMBLY FOR TURBINE MACHINE WITH OPEN ROTOR CONTRA-ROTATING PROPELLERS, COMPRISING A SMALL DUCT FOR THE PASSAGE OF ANCILLARIES

TECHNICAL DOMAIN

The invention relates to the domain of aircraft turbine machines comprising a receiver with a pair of open rotor contra-rotating propellers. Such turbine machines are also qualified as "Open Rotor" turbine machines and are disclosed for example in document FR 3 014 141.

The invention relates more precisely to an ancillaries routing duct and attachment of this duct onto a turbine machine attachment case.

The invention is particularly applicable to turbine machines with a so-called "puller" configuration, in which the pair of contra-rotating propellers is located upstream from a gas generator. Nevertheless, the invention could also be applied to turbine machines with a so-called "pusher" configuration, in which the pair of contra-rotating propellers is located downstream from the gas generator.

STATE OF PRIOR ART

On turbine machines with a receiver for a pair of open-rotor contra-rotating propellers, electrical ancillaries and/or fluid ancillaries such as lubricant pipes pass through the duct. For example, these pipes provide a means of supplying oil to roller bearings supporting rotating shafts of the turbine machine. Oil can thus lubricate and cool the roller bearings in order to limit their wear. The pipes thus also supply oil to a propeller blade pitch variation device, so as to continuously adapt to operating conditions of the turbine machine. This device is also called a pitch incidence setting device.

The duct is fixed to an attachment case of the turbine machine. It can stabilise ancillaries that pass through it over long lengths, such as those normally encountered on turbine machines comprising this type of receiver. For example, for a turbine machine with a "puller" configuration, the duct passes through the downstream propeller rotor as well as the receiver. Thus, the duct surrounds and protects the pipes, thus preventing breaks of these pipes by contact with the rotors surrounding them.

This fixed duct is conventionally fixed onto the axis of the receiver. Consequently, its outside diameter must be limited as much as possible to avoid the need to increase the diameters of elements surrounding the turbine machine, and particularly the elements through which it passes. For example, the duct may need to pass through a reduction gear located between the receiver and the gas generator, and in this case, it passes through a sun gear of this reduction gear. The outside diameter of this sun gear thus depends on the outside diameter of the duct, and if this value is too high, the dimensions of all components of said reduction gear will be increased. Obviously, this will increase the global mass of the surrounding elements concerned. In this respect, it should be noted that the reduction gear is essentially of the differential type and consists of an planetary gearset for which the reduction ratio depends directly on the ratio between the ring gear diameter and the sun gear diameter. Consequently, increasing the internal sun gear diameter makes it necessary to increase the ring gear diameter by the same factor to obtain the same reduction ratio. This creates a penalty for the engine diameter when the selected reduction ratio is large. The engine diameter imposes the hub ratio (ratio between the diameter at the blade root and at the tip) that is a critical factor for the propulsion efficiency of the engine. Consequently, this illustrates the fact that the reduction in the duct diameter has an indirect effect on the propulsion efficiency of the engine.

Furthermore, the duct is inserted axially to be installed on the turbine machine and therefore needs to pass through different elements of the turbine machine. Consequently, the inside diameter of each element through which the duct passes depends on the largest diameter of the duct downstream from the element, which is why it is useful to keep this diameter as small as possible.

Nevertheless, attachment means of the type including threaded connections such as a nut are provided for attachment of the duct on the turbine machine case. However, this type of attachment means requires the presence of a thread and a nut stop on the outside surface of the duct, which locally increases its outside diameter, thus having a direct consequence on the diameters of the elements passed through during installation of the duct, because the thread is at the downstream end of the duct.

Therefore there is a need to optimise duct attachment means onto the attachment case to limit the dimensions of this duct while providing a satisfactory mechanical attachment with the turbine machine attachment case.

SUMMARY OF THE INVENTION

The first purpose of the invention to at least partially satisfy this need is an assembly for an aircraft turbine machine comprising a receiver for a pair of open rotor contra-rotating propellers, the assembly comprising a duct, ancillaries routed inside the duct, and an attachment case comprising an annular installation portion on which a first end of the duct is fixed by attachment means, the annular installation portion of the attachment case being arranged around the first end of the duct.

According to the invention, the attachment means in an assembled configuration include:
- a split ring fitted with internal projections housed inside corresponding orifices formed through said first end of the duct;
- a radial loading surface of the split ring made on the annular installation portion of the attachment case, the radial loading surface being tapered and narrowing along a first axial direction of the duct, and being in contact with a peripheral surface of the complementary shaped tapered split ring;
- means of axially loading the split ring along said first direction, said axial loading means being blocked in the axial direction on the annular installation portion of the attachment case.

The invention thus discloses a simple and high performance system that does not require any excess thickness at the first end of the duct, for its installation on the attachment case. This advantageously reduces the mass and the dimensions of surrounding elements, and of any other elements through which the duct passes as it is installed on the turbine machine.

Furthermore, the attachment obtained is effective because firstly cooperation between the tapered surfaces and secondly the axial load on the ring by the dedicated means, combine to contribute to holding this ring in a position that prevents it from opening, thus guaranteeing that the projections are held in place in the duct orifices.

The invention may also have at least any one of the following optional characteristics, taken in isolation or in combination.

In the assembled configuration, the internal projections are stopped in the radial and axial directions in the orifices of said first end of the duct. This can advantageously achieve precise axial positioning of the attachment case, and satisfactory repeatability of this axial position. This precision is particularly advantageous when the axial position of the duct has a direct effect on the pitch of the helicopter blades, for example when the duct forms a fixed part of an actuator for changing the pitch of the blades.

Said axial loading means include a nut with an axial bearing surface and an internal thread cooperating with an external thread formed on the annular installation portion of the attachment case.

The assembly includes a closing plug at the first end of the duct, said plug including an external rim gripped in the axial direction between the split ring and the axial bearing surface of the nut.

The number of internal projections is between two and ten, each having an annular extent of between 10 and 40°. Nevertheless, the lower limit can be reduced to five. This limit depends on the size of the duct, and is chosen so as to facilitate fabrication without excessively wasting the useful perimeter for installation clearances.

The cross-section of the internal projections reduces when moving radially inwards.

The ancillaries are oil ancillaries and other types of ancillaries (fluid or electrical).

Another purpose of the invention is a turbine machine for an aircraft comprising a receiver for a pair of open rotor contra-rotating propellers, a gas generator and a reduction gear placed between the receiver and the gas generator preferably located downstream from the receiver, the turbine machine also including an assembly like that described above, with a duct passing through the reduction gear.

Preferably, the turbine machine comprises a pitch variation device for the blades of at least one of the contra-rotating propellers, said pitch variation device including a hydraulic actuator supplied by at least one ancillary routed inside the assembly duct, said duct having a second end opposite the first end fixed on a fixed part of the actuator.

Another purpose of the invention is a method of installing an assembly like that described above, including the following steps:
- put the split ring into position axially facing the annular installation portion of the attachment case, and apply load to this split ring along the circumferential direction so as to increase its diameter;
- axial displacement of the duct through the annular installation portion of the attachment case and through the split ring, such that the orifices at the first end of the duct are axially facing the internal projections in the split ring;
- release the circumferential load on the ring, such that its internal projections penetrate into the corresponding orifices at the first end of the duct;
- relative axial displacement between the annular installation portion of the attachment case and the duct fitted with the split ring, such that the tapered radial loading surface provided on the annular installation portion comes into contact with the peripheral surface of the split ring with a complementary tapered shape;
- installation of the axial loading means of the split ring, this installation possibly making the split ring contract more along the hoop direction, due to cooperation between the tapered radial loading surface and the complementary tapered peripheral surface. Alternately, the ring may already be at its maximum stop at the end of the next step, said loading means then simply being stopped in the axial downstream direction.

Other advantages and characteristics of the invention will become clear after reading the following non-limitative detailed description.

BRIEF DESCRIPTION OF THE DRAWINGS

This description will be made with reference to the appended drawings among which.

DETAILED DESCRIPTION OF PREFERRED EMBODIMENTS

Figure 1:
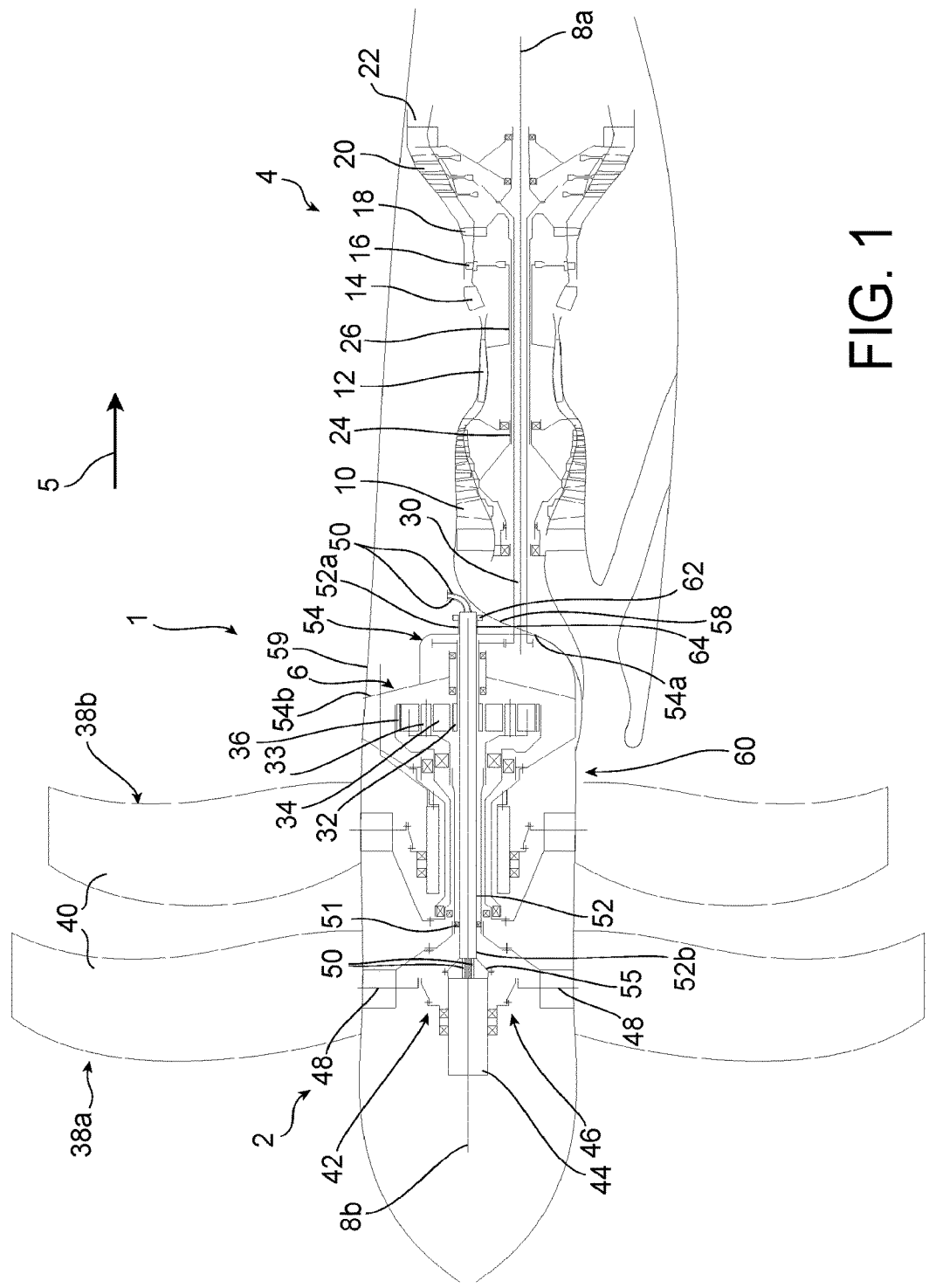
FIG. 1 is a diagrammatic longitudinal sectional view of a turbine machine according to a preferred embodiment of the invention.
Figure 2:
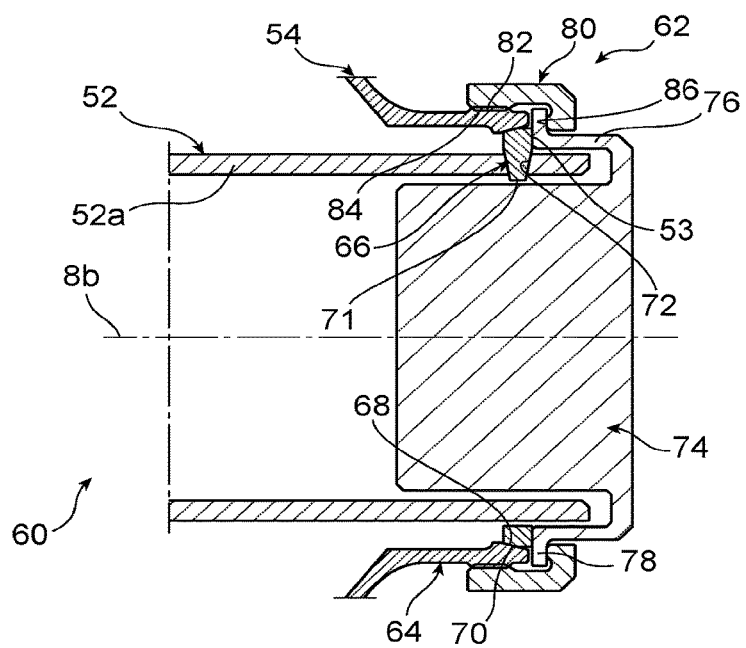
FIG. 2 is a longitudinal sectional view of part of the assembly fitted on the turbine machine shown on FIG. 1, showing the attachment of the duct onto the attachment case.

Firstly with reference to FIG. 1, the figure shows an aircraft turbine machine 1 according to a preferred embodiment of the invention. This is an Open Rotor turbine machine comprising a receiver 2, a gas generator 4 and a differential reduction gear 6 formed between the receiver and the gas generator. In this preferred embodiment, the receiver 2 is located upstream from the gas generator 4, in a so-called "puller" configuration.

The gas generator 4 uses a classical design, including several components extending around a first longitudinal axis 8a. Starting at the upstream end and working towards the downstream end along a principal gas flow direction 5 through the turbine machine, it comprises a low pressure compressor 10, a high pressure compressor 12, a combustion chamber 14, a high pressure turbine 16, a low pressure turbine 18 and a free power turbine 20. The free power turbine opens up on an ejection nozzle 22 starting from which gases from the generator are ejected in the downstream direction into the atmosphere.

The compressor 10 and the turbine 18 form a low pressure case being connected by a shaft 24, while the compressor 12 and the turbine 16 form a high pressure case being connected by a shaft 26. Another shaft 30 is connected to the free power turbine 20, and passes through the entire gas generator 4 to drive the differential reduction gear 6.

The reduction gear 6 is provided with a classical planetary gearset comprising a sun gear 32 centred on a second longitudinal axis 8b parallel to the first axis 8a, a planet gear carrier 33, planet gears 34 and a ring gear 36. The shaft 30 drives the sun gear 32 of the planetary gearset through a reduction gear stage, while the planet gear carrier 33 and the ring gear 36 each drive one of the two contra-rotating propellers of the receiver 2.

The receiver 2 comprises two open rotor contra-rotating propellers, specifically an upstream propeller 38*b* and a downstream propeller 38*b*, each fitted with blades 40. There is also a blade pitch variation device associated with each propeller 38*a*, 38*b*, and particularly a device 42 located at the forward end of the turbine machine and associated with the upstream propeller 38*a*. The device 42 can be used to vary the incidence of the blades 40 in a known manner, as a function of operating conditions. It comprises a hydraulic actuator 44 centred on the second axis 8*b*, as is the receiver assembly 2. Moreover, a kinematic connection 46 transforms the axial displacement of the sliding part of the actuator 44, into a rotation movement of the blades 40 about their axes 48 arranged transversely.

The actuator 44 is supplied with fluid, preferably with oil, through ancillaries in the form of ducts 50 routed parallel to the second axis 8*b*, from the gas generator 4 as far as the actuator 44. More precisely, these pipes 50 are routed inside a duct 52 centred on the second axis 8*b*, this duct having an approximately circular cross-section and being fixed at its downstream end called the first end 52*a* to an attachment case 54. At its upstream end called the second end 52*b*, the duct 52 is fixed to a fixed internal part of the actuator 44, through a tapered flange 55. Thus, the duct 52 passes through the downstream propeller 38*b* and the reduction gear 6 to mechanically connect to the attachment case 54, forming a shroud around this reduction gear 6 and delimiting it in the downstream direction.

A roller bearing 51 is arranged between the duct 52 and the hub of the upstream propeller 38*a*. The inner ring of this bearing 51, fixed to the duct 52, has a wide race.

The attachment case 54 extends essentially in the transverse direction and is connected at one of its ends 54*a* to a upstream case 58 of the gas generator 6, this upstream case 58 itself lying along the upstream prolongation of a case of the low pressure compressor 10. At its other end 54*b*, the attachment case 54 connects to an outer casing 59 forming a nacelle.

As can be seen on FIG. 1, the pipes 50 pass through the entire duct 52 and open up at the first end 52*a*, in a fixed part of the turbine machine, close to the low pressure compressor 10. Other ancillaries could also be routed through the duct 52, for example electrical ancillaries to supply power to sensors, or other oil ancillaries to lubricate bearings supporting rotating elements of the receiver.

The pipes 50 are stabilised, protected and possibly cut off inside the duct 52, in a known manner. Vibrations of the pipes 50 are attenuated particularly as a result of internal retaining planes (not shown), and the risk of leakage is very much reduced.

One of the special features of the invention lies in the manner in which the first end 52*a* of the duct 52 is installed on the attachment case 54 provided for this purpose. This special feature thus lies inside an assembly 60 comprising the duct 52, the pipes 50, the attachment case 54 and the means 62 of attaching the first end 52*a* of the duct to the case 54.

These attachment means 62 specific to the invention are shown only diagrammatically on FIG. 1, but they will now be described in detail with reference to FIGS. 2 to 6*b*.

Firstly, note that the attachment case 54 comprises an annular installation portion 64, centred on the second axis 8*b* and surrounding the first end 52*a* of the duct 52. The portion 64 on which the invention is mounted can advantageously be the case 54 of the reduction gear, or more particularly the first stage of the reduction gear.

The attachment means 62 comprise a split ring 66 surrounded by the annular installation portion 64. More precisely, this portion 64 comprises a radial loading surface 68 of the split ring 66, the surface 68 being tapered and becoming smaller with increasing distance along a first axial direction of the duct 52, in this case along the downstream direction. The ring also has a complementary tapered peripheral outer surface 70 at the upstream end, in contact with the surface 68. Cooperation between the shapes of these two surfaces 68, 70 blocks the ring 66 relative to the annular installation portion 64, along the axial direction in the upstream direction and outwards along the radial direction.

The split ring 66 is fitted with internal projections 71, in the form of teeth. For example, there may be three of them with an angular extent of 10 to 40°, being uniformly spaced relative to each other. They are housed inside corresponding orifices 72 formed on the first end 52*a* of the duct 52. The angular extent of the orifices 72 is practically the same as the angular extent of the teeth 71, and their shapes are practically complementary.

Figure 3:
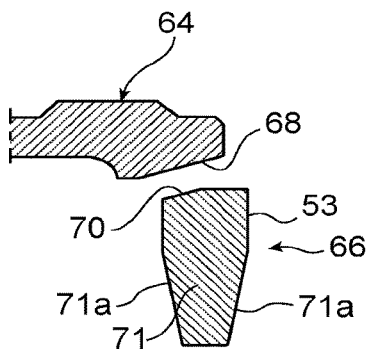
FIG. 3 is an enlarged exploded view of part of FIG. 2, showing the tapered radial loading surface and the complementary tapered peripheral surface.
Figure 4:
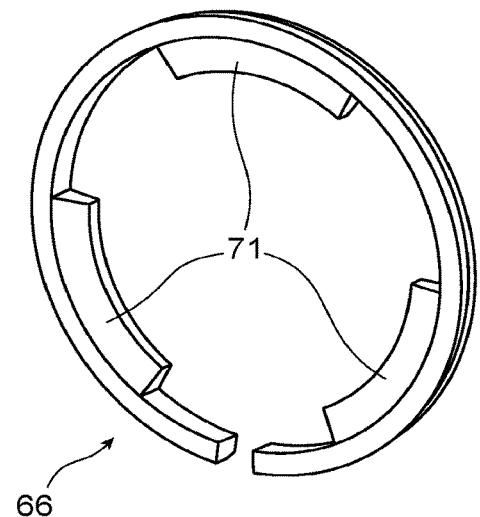
FIG. 4 is a perspective view of the split ring forming part of the assembly shown in FIG. 2.
Figure 5:
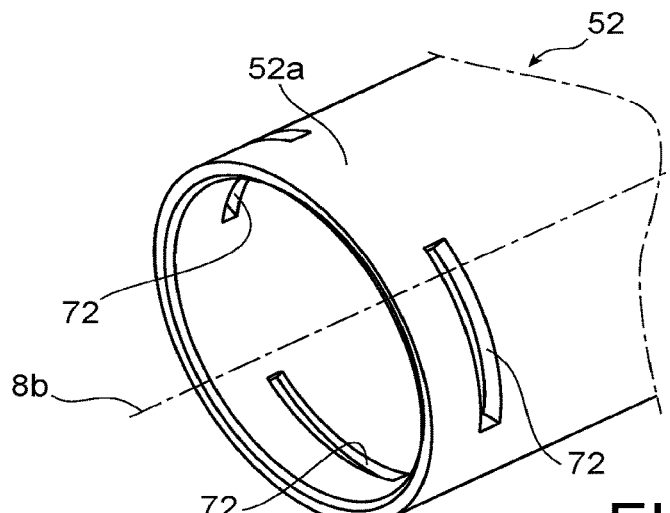
FIG. 5 is a perspective view of the first end of the duct forming part of the assembly shown in FIG. 2.
Figure 6A:
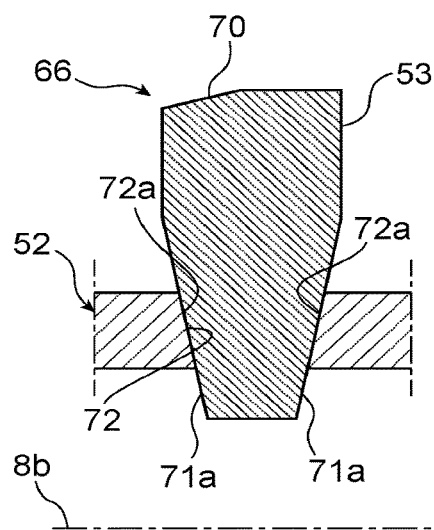
FIG. 6a is an enlarged view showing cooperation between the projections of the split ring and the orifices in the duct.

As can be seen better on FIGS. 3 and 6*a*, the cross-section of each tooth 71 gets smaller with increasing distance inwards along the radial direction. More specifically, each tooth 71 has two bevels 71*a* on each side of the tooth, along the axial direction. In the assembled configuration as shown on these figures, each of these two bevels 71*a* is in plane contact with complementary inclined surfaces 72*a*, defining the corresponding orifice 72. Consequently, cooperation of surfaces between elements 71*a*, 72*a* is such that the ring 66 can be stopped axially relative to the first end 52*a* of the duct 52, and stopped in the radially inwards direction.

Figure 6B:
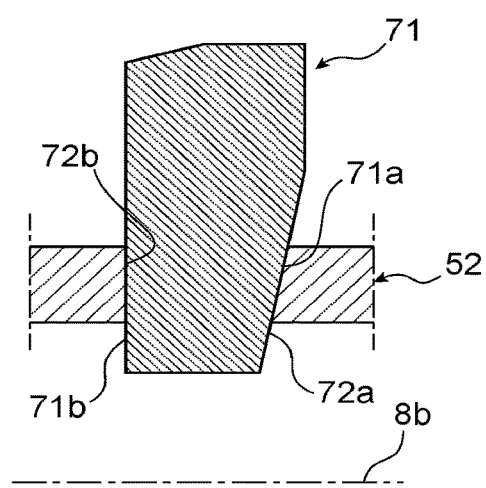
FIG. 6b is a view similar to the view in FIG. 6a, with the projections of the split ring in a different form.

According to a different embodiment shown on FIG. 6*b*, the tooth 71 only has one bevel 71*a* on its downstream end, and its upstream end is then in the form of a flat approximately orthogonal to the second axis 8*b*. Also in this case, the bevel 71*a* and the flat 71*b* are in plane contact with the complementary surfaces 72*a*, 72*b* respectively defining the corresponding orifice 72.

Therefore the teeth 71 are stopped in the radial direction and in the axial direction in the orifices 72 in both cases, so that the axial position of the split ring 66 relative to the duct 52 is repeatable.

The assembly 60 also comprises a closing plug 74 closing off the first end 52*a* of the duct 52. The oil pipes can also pass through this plug 74, comprising an outer rim 76 surrounding this end 52*a*. The outer rim 76 comprises an annular end 78 oriented transversely outwards and arranged to bear axially in the upstream direction in contact with the downstream side of the split ring 66.

Thus the split ring 66 is blocked in the axial direction by the association between the bevels 71*a* and inclined complementary surfaces 72*a*, of the tapered surface 70 stopped in contact with the complementary tapered surface 68 of the case 64, and the plug 74 is stopped in the axial direction on the downstream lateral part of the ring, on a bearing surface reference 53.

Moreover, the attachment means 62 include means 80 of applying axial load on the split ring, in the upstream axial direction. In this case, this is a nut 80 blocked in the axial direction on the annular installation portion 64 by means of a thread 82 formed on the outer surface of the portion 64 that cooperates with an inside thread 84 of the nut. In order to maintain the required axial load, the nut 80 has an axial bearing surface 86 that applies a pressure on the annular end 78, that is thus gripped in the axial direction between the split ring and the axial bearing surface 86 of the nut 80.

We will now describe several successive steps in a method for installing the assembly 60, with reference to FIGS. 7a to 7e.

Figure 7A:
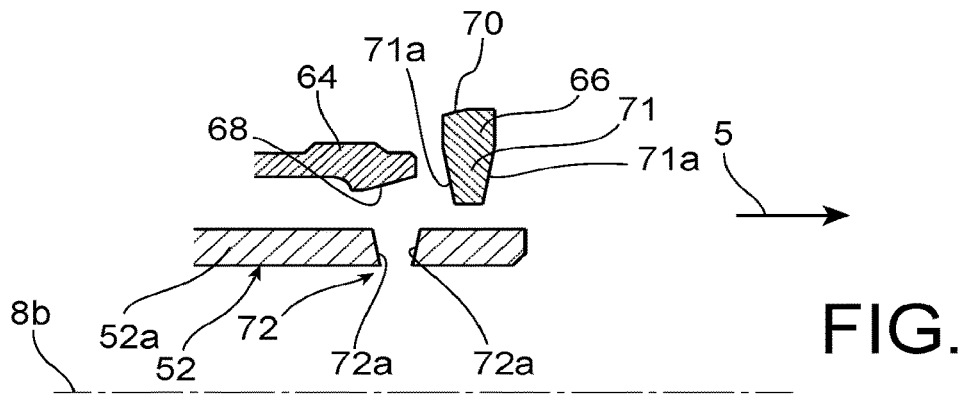
FIGS. 7a to 7e diagrammatically show different successive steps in a method of assembly shown on the previous figures.

It comprises firstly a step to place the split ring 66 along the axial direction facing the annular installation portion 64 of the attachment case 54, downstream from this portion 64 as shown on FIG. 7a. The ring 66 is also loaded along its hoop direction, so as to increase its diameter and make sure that its teeth 71 are located around the first end 52a of the duct 52, and at a radial distance from it. This load is applied by opening up the ring manually, or by the use of a special tool to increase its diameter without going outside the range of elastic strain.

Figure 7B:
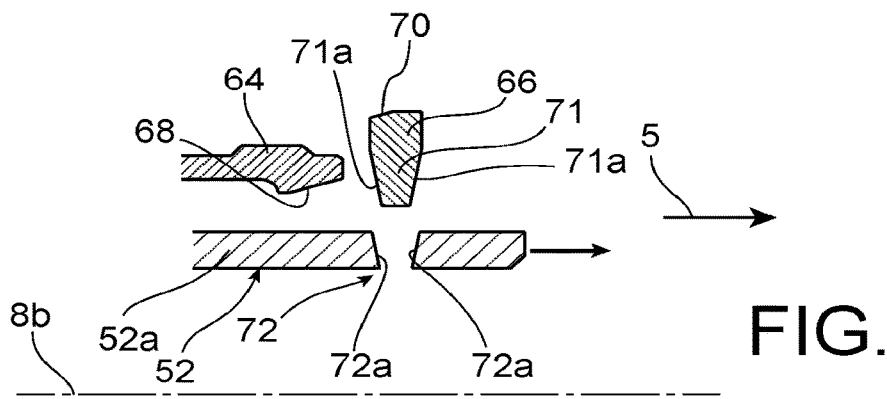

Then, as can be seen on FIG. 7b, the duct 52 is displaced in the downstream axial direction through the annular installation portion 64 and through the split ring 66. Due to this limited amplitude displacement, the orifices 72 of the duct are facing the teeth 71 in the radial direction. Note that this displacement is made with the inner ring of the roller bearing 51 (FIG. 1) fixed to the duct 52. The wide race of this inner ring is thus mounted at the same time as the duct, so that the bearing 51 can slide easily during installation and more smoothly during operation. In this respect, it would be possible for the wide race to be made in a single piece with the duct, which would then be thickened at this location.

Figure 7C:
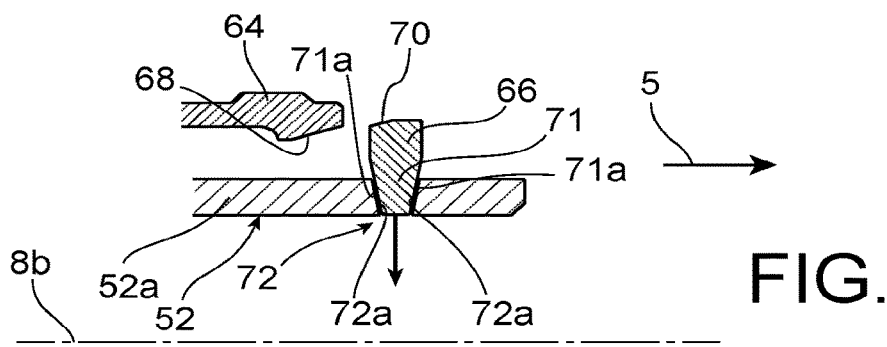
Figure 7D:
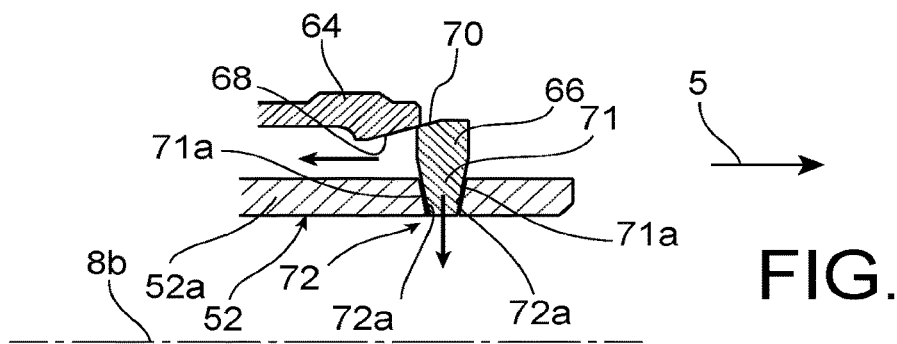
Figure 7E:
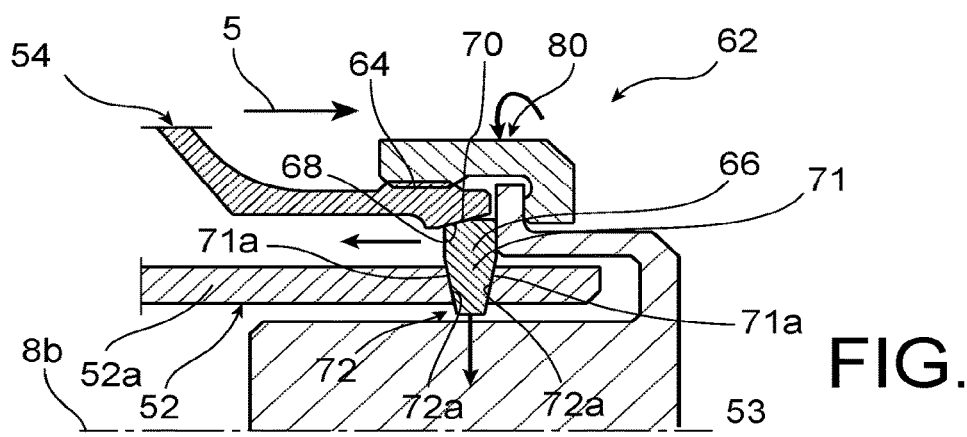

As shown on FIG. 7c, the next step is to release the hoop load on the split ring 66. The diameter of the split ring will be reduced due to the elastic effect, therefore it will return to its nominal unstressed shape. During this elastic return, the teeth 71 will penetrate into the orifices 72 of the duct. Nevertheless, once the nominal shape is restored, there is still an axial clearance and a radial clearance between at least some of the teeth 71 and their corresponding orifices 72. In other words, as can be seen on FIG. 7c, there is no contact between all surfaces 71a and their corresponding surfaces 72a.

The method is continued by making a relative axial displacement between the annular installation portion 64 and the duct 52 fitted with the ring 66. This is done by displacing the duct 52 in the upstream direction, so that it moves back into its initial position also shown on FIG. 7a. During this displacement, the radial loading surface 68 formed on the annular installation portion 64 comes into contact with the peripheral surface 70 of the ring 66. After thus coming into contact, the continued upstream axial displacement of the duct 52 causes contraction of the ring 66 along the hoop direction, due to cooperation between the tapered surfaces 68, 70. This hoop contraction of the ring 66 causes more accentuated penetration of the teeth 71 in their orifices 72, tending to fill in the clearances between surfaces 71a, 72a as shown on FIG. 7d. This brings the teeth 71 into contact with their axial and radial stops in their corresponding orifices 72 as shown in FIG. 6a or 6b, and brings the surfaces 70 and 68 into position as shown on FIG. 2.

The nut 80 is then installed and tightened, after installing the plug 74 on the first end 52a. In the above assumption whereby the teeth 81 are already at their axial and radial stops at the end of the previous step, installation of the plug 74 can then prevent all the means in position from moving in the axially downstream direction, thus preventing the teeth 71 from coming out of their orifices 72. In the other assumption in which the teeth 71 are not yet at their axial and radial stops in the orifices 72, installation of the plug 74 then forces the ring 66 to contract even further, once again due to cooperation between the tapered surfaces 68, 70. Screwing is stopped when the teeth 71 reach their axial and radial stops in their corresponding orifices 72 as can be seen on FIG. 7e. These stops create a plane contact between the surfaces 71a and their associated complementary surfaces 72a. Precise and repeatable axial positioning of the split ring 66 relative to the attachment case 54 is thus advantageously achieved.

Finally, since the forces passing through the duct 52 originate from aerodynamic forces applied to the blades 40, these forces can easily be transmitted to the case 54 through the split ring 66.

Obviously, an expert in the subject can make various modifications to the invention that has just been described solely as non-limitative examples.

The invention claimed is:

1. An assembly for an aircraft turbine machine comprising a receiver for a pair of open rotor contra-rotating propellers, the assembly comprising a duct, ancillaries routed inside the duct, and an attachment case comprising an annular installation portion on which a first end of the duct is fixed by attachment means, the annular installation portion of the attachment case being arranged around the first end of the duct,
wherein the attachment means in an assembled configuration include:
a split ring fitted with internal projections housed inside corresponding orifices formed through said first end of the duct;
a radial loading surface of the split ring made on the annular installation portion of the attachment case, the radial loading surface being tapered and narrowing along a first axial direction of the duct, and being in contact with a complementary tapered peripheral surface of the split ring;
axial loading means of axially loading the split ring along said first direction, said axial loading means being blocked in the axial direction on the annular installation portion of the attachment case.

2. The assembly according to claim 1, wherein in the assembled configuration, the internal projections are stopped in the radial and axial directions in the orifices of said first end of the duct.

3. The assembly according to claim 1, wherein said axial loading means include a nut with an axial bearing surface and an internal thread cooperating with an external thread formed on the annular installation portion of the attachment case.

4. The assembly according to claim 3, wherein a closing plug at the first end of the duct, said plug including an external rim gripped in the axial direction between the split ring and the axial bearing surface of the nut.

5. The assembly according to claim 1, wherein the number of internal projections is between two and ten, each having an annular extent of between 10 and 40°.

6. The assembly according to claim 1, wherein the cross-section of the internal projections reduces when moving radially inwards.

7. The assembly according to claim 1, wherein the ancillaries are oil ancillaries.

8. Turbine A turbine machine for an aircraft comprising a receiver for a pair of open rotor contra-rotating propellers, a gas generator and a reduction gear placed between the receiver and the gas generator preferably located downstream from the receiver, the turbine machine also including an assembly according to claim 1, with a duct passing through the reduction gear.

9. The turbine machine according to claim 8, further comprising a pitch variation device for the blades of at least one of the contra-rotating propellers, said pitch variation device including a hydraulic actuator supplied by at least one ancillary routed inside the assembly duct, said duct having a second end opposite the first end fixed on a fixed part of the actuator.

10. An installation method for an assembly according to claim 1, comprising the following steps:
- put the split ring into position axially facing the annular installation portion of the attachment case, and apply load to this split ring along the circumferential direction so as to increase its diameter;
- axial displacement of the duct through the annular installation portion of the attachment case and through the split ring, such that the orifices at the first end of the duct are axially facing the internal projections in the split ring;
- release the circumferential load on the ring, such that its internal projections penetrate into the corresponding orifices at the first end of the duct;
- relative axial displacement between the annular installation portion of the attachment case and the duct fitted with the split ring, such that the tapered radial loading surface provided on the annular installation portion comes into contact with the peripheral surface with a complementary tapered shape;
- installation of the axial loading means of the split ring, this installation possibly increasing contraction of the split ring contract in the hoop direction, due to cooperation between the tapered radial loading surface and the complementary tapered peripheral surface.

* * * * *

UNITED STATES PATENT AND TRADEMARK OFFICE
CERTIFICATE OF CORRECTION

PATENT NO. : 10,479,514 B2
APPLICATION NO. : 15/398445
DATED : November 19, 2019
INVENTOR(S) : Mouton et al.

Page 1 of 1

It is certified that error appears in the above-identified patent and that said Letters Patent is hereby corrected as shown below:

On the Title Page

Item [72], delete "Tourman" and insert --Tournan--.

In the Claims

Column 8, Line 61, Claim 8 before "A turbine" delete "Turbine".

Column 9, Line 26, Claim 10 after "surface" insert --of the split ring--.

Signed and Sealed this
Nineteenth Day of May, 2020

Andrei Iancu
*Director of the United States Patent and Trademark Office*